United States Patent [19]

Matsumura et al.

[11] Patent Number: 5,426,002
[45] Date of Patent: Jun. 20, 1995

[54] INTERNAL REFORMING TYPE FUEL CELL APPARATUS AND OPERATION METHOD OF SAME

[75] Inventors: Mitsuie Matsumura; Chika Hirai, both of Amagasaki, Japan

[73] Assignee: Mitsubishi Denki Kabushiki Kaisha, Tokyo, Japan

[21] Appl. No.: 117,698

[22] Filed: Sep. 8, 1993

[30] Foreign Application Priority Data

Sep. 11, 1992 [JP] Japan .................. 4-243345

[51] Int. Cl.⁶ .................................. H01M 8/06
[52] U.S. Cl. .............................. 429/20; 429/24
[58] Field of Search ..................... 429/17, 20, 24

[56] References Cited

U.S. PATENT DOCUMENTS

| | | | |
|---|---|---|---|
| 3,206,333 | 9/1965 | Ehrenfeld | 429/20 |
| 3,544,376 | 12/1970 | Connor et al. | 429/17 |
| 4,365,007 | 12/1982 | Maru et al. | 429/17 X |
| 4,647,516 | 3/1987 | Matsumura et al. | |
| 4,650,728 | 3/1987 | Matsumura et al. | |
| 4,877,693 | 10/1989 | Baker | 429/20 X |
| 5,006,425 | 4/1991 | Takabayashi | 429/24 X |
| 5,175,062 | 12/1992 | Farooque et al. | 429/20 |

Primary Examiner—Stephen Kalafut
Attorney, Agent, or Firm—Oblon, Spivak, McClelland, Maier & Neustadt

[57] ABSTRACT

In an internal reforming fuel cell apparatus and an operation method of the fuel cell apparatus, a reforming catalyst is disposed in a low-temperature operating portion of a fuel gas passage and temperature control is performed so that the temperature of the low-temperature operating portion will not exceed an activity deterioration limit temperature of the reforming catalyst. Accordingly, a service life of the reforming catalyst is prolonged and stable cell characteristics are obtained for a long period without deteriorating the cell characteristics.

10 Claims, 7 Drawing Sheets

INTERNAL REFORMING TYPE FUEL CELL APPARATUS AND OPERATION METHOD OF SAME

FIELD OF THE INVENTION

The present invention relates to an internal reforming type fuel cell apparatus using a molten carbonate and an operation method of the fuel cell apparatus, and more particularly to prevention of a reforming catalyst from deteriorating its activity.

DESCRIPTION OF THE RELATED ART

FIG. 7 is a perspective view, partly cut away, of an internal reforming type fuel cell apparatus disclosed as a prior art in Japanese Patent Laid-Open No. 61-13576. Referring to FIG. 7, a fuel gas electrode 1 and an oxidizing gas electrode 2 are arranged opposing to each other through an electrolyte layer 3, thereby constituting a single cell 4. A fuel gas passage 5 is disposed opposing to the fuel gas electrode 1, and an oxidizing gas passage 6 is disposed opposing to the oxidizing gas electrode 2. The fuel gas passage 5 is formed by a fuel gas passage forming member 7, and the oxidizing gas passage 6 is formed by an oxidizing gas passage forming member 8. In the case of laminating a plurality of single cells 4, a separator plate 9 serves to separate the fuel gas passage 5 from the oxidizing gas passage 6 and electrically connect the plurality of single cells 4 in series. A fuel cell laminate 10 is built up by laminating the plurality of single cells 4 through the separator plates 9 disposed between every two single cells. A reforming catalyst 11 is held inside the fuel gas passage 5. In FIG. 7, the fuel gas passage 5 and the; oxidizing gas passage 6 are disposed to extend in directions orthogonal to each other (crossed flow type). The fuel gas and the oxidizing gas are supplied and discharged through a gas manifold 12.

FIG. 8 is a system block diagram schematically showing a fuel cell and a peripheral apparatus for carrying out temperature control of the fuel cell in a molten-carbonate type fuel cell power generation system publicized in US GRI report No. FCR-3522-2. In FIG. 8, an air supply device 23 recovers power from exhaust gas F discharged from the fuel cell power generation system and supplies air E from the outside after boosting a pressure of the air. A circulation blower 24 circulates a part of oxidizing gas D for carrying out temperature control of a fuel cell apparatus 100. A heat exchanger 25 performs temperature control of circulating gas as oxidizing gas circulated by the circulation blower 24. Arrows A, B indicate flows of fuel gas supplied to and discharged from the fuel cell apparatus, and arrows C, D indicate flows of the oxidizing gas, respectively.

Operation of the fuel cell apparatus will now be described. When fuel such as hydrocarbon and steam are supplied to the fuel gas passage 5, the hydrocarbon reacts with the steam through a contact reaction with the reforming catalyst 11, and is converted into hydrogen, carbon monoxide and carbon dioxide. In the case of the hydrocarbon being methane, the reaction is expressed by formula, (1) below:

$$CH_4 + H_2O \rightarrow CO + 3H_2 \quad (1)$$

The generated hydrogen and carbon monoxide pass through holes bored in the fuel gas passage forming member 7, and then disperse into fine holes of the porous fuel gas electrode 1. On the other hand, a gas mixture of air and carbon dioxide is supplied to the oxidizing gas passage 6 for dispersion into fine holes of the porous oxidizing gas electrode 2. The reaction gas is consumed by an electrochemical reaction developed between a carbonate impregnated in the electrolyte layer 3 and held in a molten state nearly at 650° C. as an operating temperature, the electrodes 1, 2 and the reaction gas mainly consisted of hydrogen and oxygen, thereby producing a potential between current collectors (not shown) so that electric power is taken out re, the outside. Additionally, a reforming reaction occurred on the reforming catalyst 11 is an endothermic reaction, and the amount of heat necessary for sustaining the endothermic reaction is supplied by the heat generated by the above electrochemical reaction.

For steady operation of a fuel cell, it is required to remove the heat generated by the cell reaction under cooling. To this end, an internal reforming fuel cell usually employs a combination of cooling due to sensible heat of the oxidizing gas and cooling due to the internal reforming reaction. In a molten-carbonate type fuel cell, temperature control is usually made nearly at an average temperature of 650° C., taking into account a balance between a reduction in the amount of corrosion of cell components resulted from a lower operating temperature and an improvement in cell performance resulted from a higher operating temperature. (See Handbook of Fuel Cell Performance; US DOE Report Contract No. EC-77-C-03-1545, (May 1980)).

During operation of a fuel cell apparatus, the fuel cell apparatus is required to be kept nearly at the above operating temperature by properly carrying out temperature control. More specifically, under operating conditions with a steady load, the thermal energy concomitantly generated is removed by cooling to hold the fuel cell apparatus at a constant temperature. On the other hand, under operating conditions with no load or a small load, the fuel cell apparatus is heated conversely to prevent the temperature from lowering due to heat radiation.

As temperature control methods for a fuel cell apparatus aiming at such cooling and heating, it is general to circulate a gaseous phase heat medium in the case of a molten-carbonate type fuel cell. Practically, in FIG. 8, a part of the oxidizing gas as reaction gas for the fuel cell is recirculated through the heat exchanger 25 provided outside the system to perform temperature adjustment of the fuel cell apparatus 100. Furthermore, in FIG. 8, a part of the oxidizing gas D is also recirculated to the fuel cell apparatus 100 by the circulation blower 24 to serve as not only reaction gas but also cooling gas. Temperature control of the fuel cell apparatus 100 is performed by adjusting a flow rate and temperature of the oxidizing gas C through functions of the circulation blower 24 and the heat exchanger 25 so that the representative temperature of the fuel cell apparatus 100 meets predetermined temperature conditions.

Conventional temperature control conditions are as follows in general. There usually exists large temperature distribution in a single cell plane of the fuel cell apparatus such that even though the average temperature is about 650° C., for example, the temperature varies from about 570° C. at minimum to about 680° C. at maximum. Therefore, temper control of the fuel cell apparatus having such wide temperature distribution is generally performed by a method of, for example, setting three reference temperatures, i.e., upper and lower limit temperatures and an average temperature, below:

1. Upper limit operating temperature—this is determined from a point of suppressing corrosion of the cell components (except the reforming catalyst);
2. Lower limit operating temperature—this is determined from points of preventing solidification of the electrolyte and improving cell characteristics; and
3. Average operating temperature—this is a target average operating temperature for the entire fuel cell apparatus.

Temperature control parameters such as a flow rate and temperature of the oxidizing gas C are adjusted to make temperature control so that temperatures at plural portions of the fuel cell apparatus measured by temperature measuring means, e.g., thermocouples, satisfy the upper and lower limit operating temperatures. Further, an average operating temperature of the fuel cell apparatus is determined from the temperatures measured at the plural portions, and temperature control is performed so that the determined average operating temperature approaches the target average operating temperature. In a molten-carbonate type fuel cell apparatus, it is usual to set, by way of example, the target average operating temperature at 650° C., the upper limit operating temperature in the range of 680° to 700° C., and the lower limit operating temperature in the range of 500° to 540° C., respectively.

Meanwhile, the reforming catalyst 11 is held in the fuel gas passage 5 in the internal reforming type fuel cell apparatus, but it is less resistant against heat than the other cell components. Heat resistance of a reforming catalyst is largely dependent on the composition and kind of the reforming catalyst, the amount of an electrolyte deposited, the composition of fuel gas, etc. In the case of a Ni/MgO catalyst, for example, activity of the catalyst remarkably deteriorates with operation in excess of 5000 hours under temperature conditions not lower than 650° C. in a fuel gas atmosphere containing vapor of the electrolyte. Thus, the upper limit operating temperature for the reforming catalyst is desirably held at 630° C. or below.

In a conventional operation method, the same upper and lower limit temperatures are set and applied to all operating regions of the fuel cell apparatus. Accordingly, if an upper limit operating temperature (e.g., 630° C.) which is lower than the upper limit operating temperature so far set is newly introduced to operation of the fuel cell apparatus, the operation must be performed by entirely reducing the operating temperature through 50° to 70° C. As a result, the average stack voltage is lowered on the order of 50 to 100 mV per single cell and the efficiency of power generation is lowered on the order of 3.5 to 7%. In practice, however, it is difficult to allow such a large reduction in the cell voltage and the efficiency of power generation. For this reason, the concept of lowering the upper limit operating temperature for the reforming catalyst is not practically employed and the internal reforming cell is also operated nearly at the average operating temperature of 650° C.

Thus, in the conventional operation method, the reforming catalyst is inevitably present under high temperature not less than 650° C. In particular, when the operation is continued for a long period, activity of the catalyst residing in such a high temperature range remarkably deteriorates. Accordingly, there arises a drawback that methane in the fuel gas flowing through the fuel gas passage in the operating region at high temperature is not decomposed by the reforming catalyst and then discharged from the fuel cell apparatus to the outside of the system while being not decomposed and utilized, under a condition where activity of the reforming catalyst has deteriorated after the operation for a long period. This has been a primary factor of reducing efficiency of the internal reforming cell and determining its service life.

In short, with the conventional fuel cell apparatus constructed and operated as explained above, deterioration of the reforming catalyst held in the fuel gas passage belonging to the high-temperature region in the cell plane gave rise to a problem that the amount of methane not decomposed in the discharged fuel gas is inevitably increased and the service life of the internal reforming cell is shortened. Also, if the average operating temperature of the fuel cell apparatus is lowered for protection of the reforming catalyst, the cell voltage is reduced to such an extent as to cause a problem in efficiency of power generation.

SUMMARY OF THE INVENTION

With a view of solving the above-mentioned problems, an object of the present invention is an internal reforming type fuel cell apparatus and an operation method of the fuel cell apparatus, with which a reforming catalyst has a prolonged service life and stable characteristics can be obtained for a long period without deteriorating cell characteristics.

To achieve the above object, according to the present invention, there is provided an internal reforming type fuel cell apparatus comprising a fuel cell laminate built up by laminating a plurality of single cells through separator plates, each of said single cells being constituted by a fuel gas electrode and an oxidizing gas electrode opposing to each other through an electrolyte layer, a fuel gas passage formed between said fuel gas electrode and said separator plate on one side of any of said fuel gas electrode and said separator plate, an oxidizing gas passage formed between said oxidizing gas electrode and said separator plate on one side of any of said oxidizing gas electrode and said separator plate, gas manifolds for supplying, distributing and discharging fuel gas and oxidizing gas both supplied from the outside with respect to said fuel gas passage and said oxidizing gas passage, and a reforming catalyst disposed in a low-temperature operating portion of said fuel gas passage produced due to temperature distribution in said single cell.

The above internal reforming type fuel cell apparatus preferably further comprises a temperature control mechanism for forming and sustaining the low-temperature operating portion in said single cell plane.

In the above internal reforming type fuel cell apparatus, said reforming catalyst may be disposed in the low-temperature operating portion where an electrode reaction does not take place.

In the above internal reforming type fuel cell apparatus, a flow type of said fuel gas may be of the return flow type or the straight flow type.

Furthermore, according to the present invention, there is also provided an operation method of an internal reforming type fuel cell apparatus including a fuel cell laminate built up by laminating a plurality of single cells through separator plates, each of said single cells being constituted by a fuel gas electrode and an oxidizing gas electrode opposing to each other through an electrolyte layer, a fuel gas passage formed between said fuel gas electrode and said separator plate on one side of any of said fuel gas electrode and said separator plate, an oxidizing gas passage formed between said oxidizing gas electrode and said separator plate on one side of any of said oxidizing gas electrode and said separator plate, gas manifolds for supplying, distributing and discharging fuel gas and oxidizing gas both supplied from the outside with respect to said fuel gas passage and said oxidizing gas passage, and a reforming catalyst disposed in a low-temperature operating portion of said fuel gas passage produced due to temperature distribution in said single cell, the operation method comprising the steps of introducing fuel gas and oxidizing gas from said gas manifolds into said fuel gas passage and said oxidizing gas passage, respectively, to cause electrode reactions at said fuel gas electrode and said oxidizing electrode, and performing temperature control so that the temperature of the low-temperature operating portion of said fuel gas passage produced due to temperature distribution in said single cell will not exceed an activity deterioration limit temperature of said reforming catalyst.

With the present invention, the temperature distribution inevitably intrinsically produced in the fuel cell apparatus during its operation is utilized to dispose the reforming catalyst in the fuel gas passage belonging to the low-temperature operating portion, whereby activity of the reforming catalyst can be held for a long period without deteriorating cell characteristics. In addition, the supplied fuel gas is sufficiently contacted with the reforming catalyst having a high degree of activity and disposed in the low-temperature operating portion, whereby hydrocarbon is so sufficiently reformed in a stable manner for a long period as to provide a fuel cell with good internal reforming characteristics.

Also, with such an arrangement that the temperature control mechanism is inserted in the laminate to form the low-temperature operating portion in the single cell plane, the low-temperature operating portion can be precisely controlled in its temperature, the degree of freedom in operating conditions can be increased in comparison with the case of utilizing the temperature distribution inevitably intrinsically produced in the fuel cell apparatus during its operation, and further the position of the low-temperature operating portion in the single cell plane can be relatively freely set.

Moreover, with such an arrangement that the low-temperature operating portion is formed in a region not subjected to the electrode reaction, a fear of an adverse effect on the cell characteristics is lessened and the temperature of the portion where the reforming catalyst is disposed can be set to a lower level.

Additionally, with temperature control made so that the temperature of the low-temperature operating portion will not exceed the activity deterioration limit temperature of the reforming catalyst, the internal reforming type fuel cell apparatus can be stably operated for a long period without lowering activity of the reforming catalyst.

DETAILED DESCRIPTION OF THE PREFERRED EMBODIMENTS

Embodiment 1

Hereinafter, an embodiment of the present invention will be described with reference to the drawings.

Figure 1:
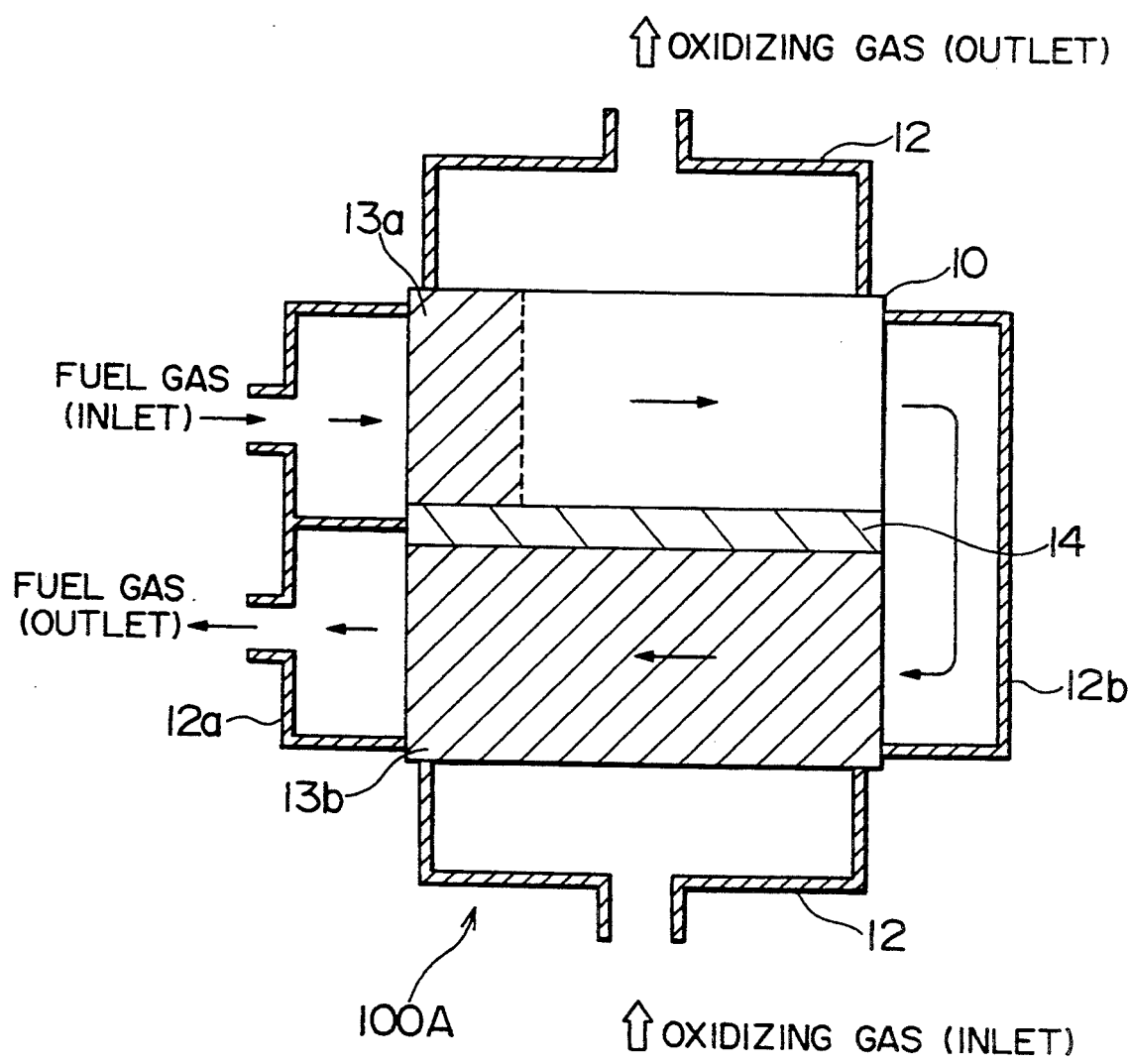
FIG. 1 is a schematic sectional view showing a primary part of a fuel cell apparatus according to one embodiment of the present invention.

FIG. 1 shows a laminate of fuel cells, sectioned in a single cell plane, according to another embodiment of the present invention. Note that the same reference numerals denote the same or corresponding parts. In FIG. 1, 13a, 13b indicated by hatched areas represent low-temperature operating portions produced on the basis of temperature distribution in the cell plane. A reforming catalyst (not shown) is held in a fuel gas passage positioned in the low-temperature operating portions 13a, 13b. A partition 14 is disposed in the fuel gas passage. An inlet/outlet gas manifold 12a, a return gas manifold 12b and the partition 14 cooperatively define a flow of fuel gas into the return flow type, as indicated by arrows in FIG. 1.

Figure 2:
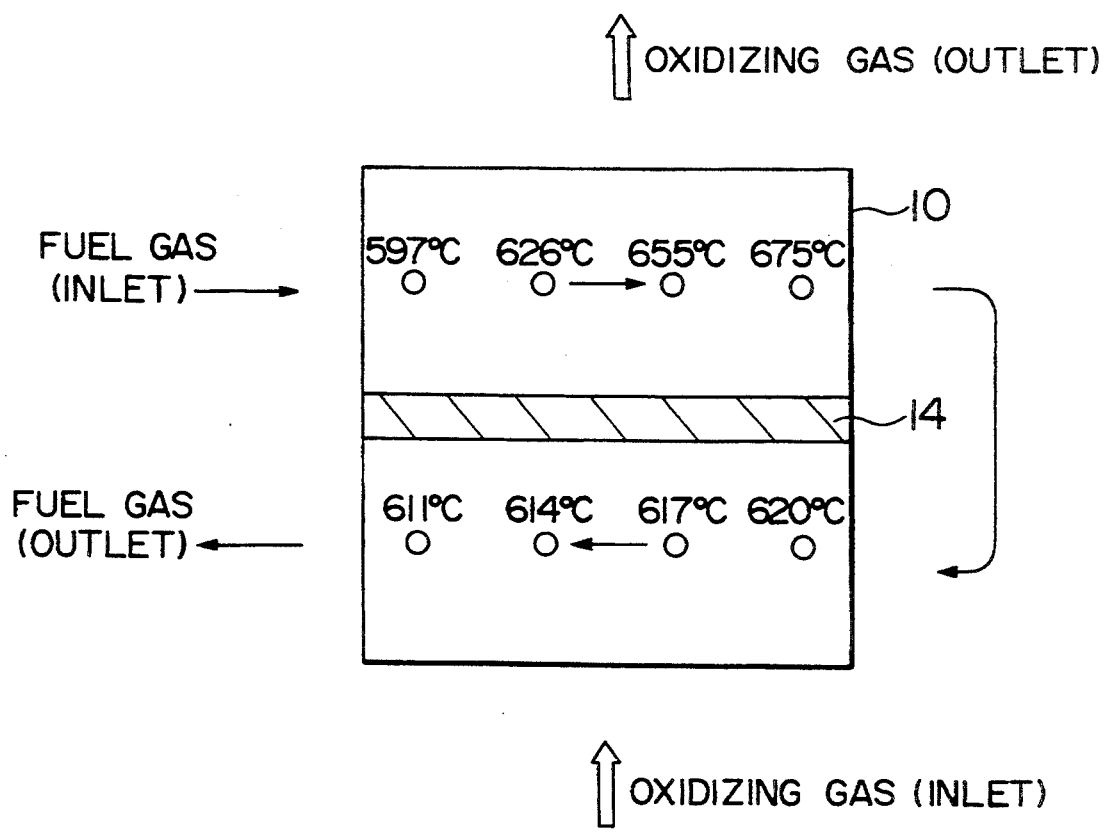
FIG. 2 is an explanatory view showing one example of temperature distribution in a single cell plane in the internal reforming type fuel cell apparatus according to one embodiment of the present invention.

The operation of this embodiment will now be described. In the case of an internal reforming type fuel cell apparatus, the fuel cell apparatus is primarily cooled by a combination of endothermic effect concomitant with a reforming reaction of raw fuel, such as hydrocarbon or alcohols, cooling effect due to the negative heat of reaction gas (generally oxidizing gas). The amount of heat absorbed by the reforming reaction is determined depending on the amount of raw fuel supplied, but the amount of raw fuel supplied is in turn almost uniquely determined depending on the amount of current (i.e., the amount of electrochemical reaction) taken out of the fuel cell apparatus. Accordingly, it is hard to use an endothermic reaction for the reforming reaction as an operation parameter for adjusting an average operating temperature and temperature distribution of the fuel cell apparatus. Temperature adjustment of the fuel cell apparatus is usually made by adjusting an inlet temperature of oxidizing gas and an amount of the oxidizing gas supplied to the fuel cell apparatus. In the internal reforming type fuel cell apparatus, a fuel gas inlet portion of the fuel cell laminate in the direction of flow of the fuel gas and an oxidizing gas inlet portion in the direction of flow of the oxidizing gas become low-temperature operating portions in the cell plane under operating conditions with a steady load. These two portions are defined as the low-temperature operating portions 13a, 13b and the fuel cell apparatus 100A is operated so that an upper limit operating temperature of the low-temperature operating portions 13a, 13b is kept not higher than the upper limit operating temperature (set to 630° C. in this case) for the reforming catalyst. FIG. 2 shows one example of temperature distribution in the single cell plane of the internal reforming type fuel cell apparatus during the steady load operation (150 mA/cm$^2$). As shown in FIG. 2, although the average temperature is on the order of 630° C. and the maximum temperature in the cell plane is on the order of 675° C., the maximum temperature in the low-temperature operating portions 13a, 13b is on the order of 620° C. and held sufficiently below the upper limit operating temperature for the reforming catalyst. Accordingly, activity of the reforming catalyst held in the fuel gas passage positioned in the low-temperature operating portions 13a, 13b is stably held for a long period. Thus, the low-temperature operating portions 13a, 13b each having a temperature range of about 590° to 630° C. can be set in the fuel gas inlet portion and the oxidizing gas inlet portion by utilizing the existing temperature distribution, as shown in FIG. 1, without lowering the average operating temperature.

On the other hand, if the upper limit operating temperature (630° C.) for the reforming catalyst was applied to the fuel cell apparatus 100A operated in accordance with the conventional method, the following would be resulted. With the conventional operation method, the same upper limit operating temperature is applied to the entire cell plane. In order to keep the maximum temperature not higher than the upper limit operating temperature (e.g., 630° C.) for the reforming catalyst over the entire cell plane, therefore, the average operating temperature of the fuel cell apparatus would be required to be lowered through about 50° C. But, such a large lowering of the average operating temperature would deteriorate characteristics of the fuel cell apparatus and the above operation method could not be adopted in practice.

Heat resistance of a reforming catalyst is largely dependent on the composition and kind of the reforming catalyst, the amount of an electrolyte deposited, the composition of fuel gas, etc. As a result of holding a Ni/MgO catalyst in place for 8000 to 10000 hours, the retention rate of activity after the operation (i.e., the activity ratio of the catalyst used to fresh one) was improved from 5-10% to 60% by lowering the operating temperature from 650° C. to 600° C. Thus, the reforming catalyst held in the low-temperature operating portions can keep a sufficient degree of activity even after the operation for a long period in excess of 10000 hours. Because the, upper limit operating temperature for the reforming catalyst suitable for the operation for such a long period, by way of example, in excess of 10000 hours is different depending on the operating conditions, the upper limit operating temperature is practically determined by conducting a life test of the internal reforming cell and activity evaluation of the reforming catalyst with temperature as a parameter. According to results of this embodiment obtained by the inventors, it is desired in the case of a Ni/MgO catalyst that the upper limit operating temperature is held not higher than 630° C. for achieving the operation in excess of 10000 hours.

Figure 3:
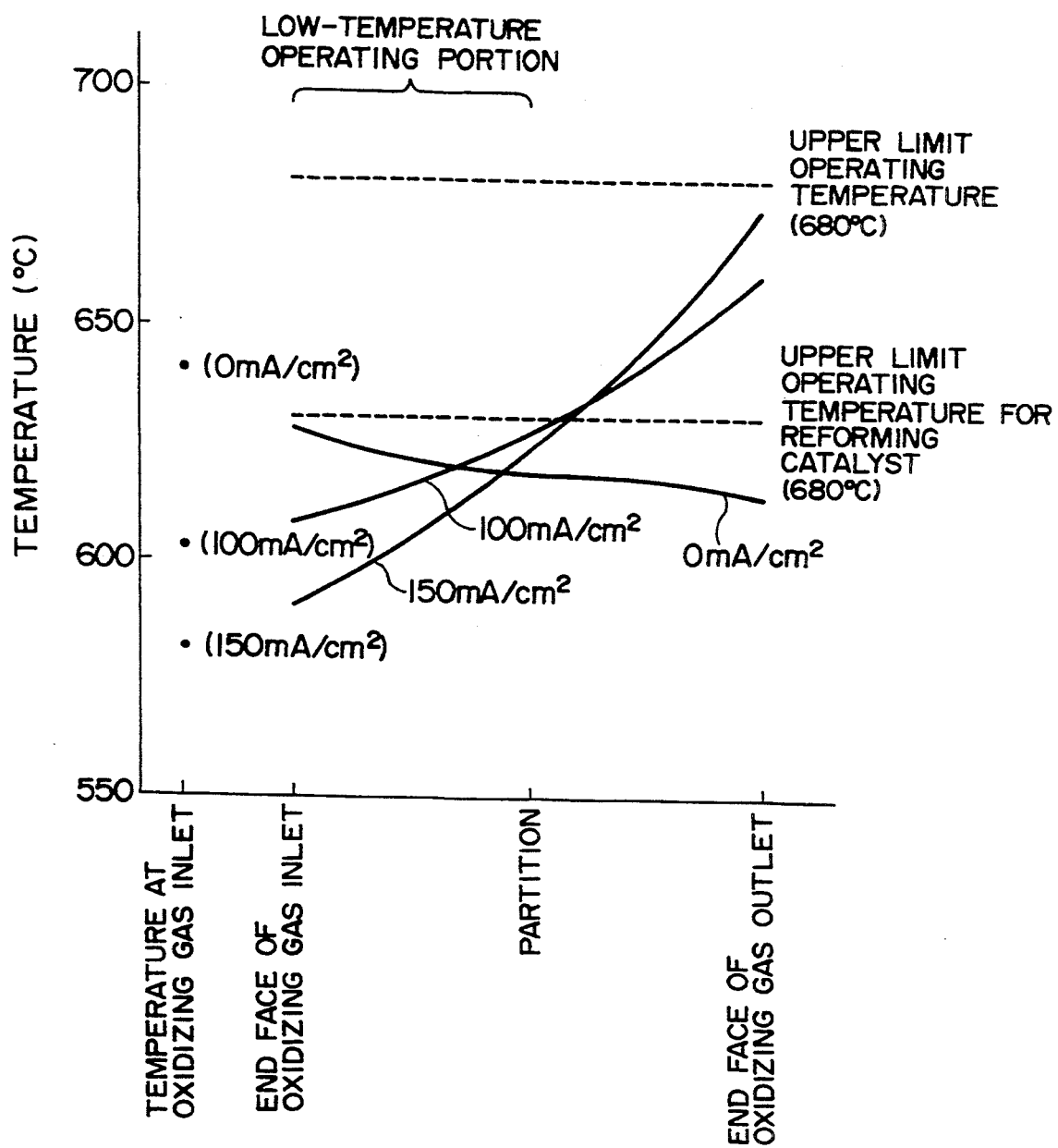
FIG. 3 is a graph showing temperatures at an oxidizing gas inlet and temperature distributions inside the fuel cell apparatus in the direction of flow of the oxidizing gas at different current densities of the fuel cell apparatus operated by an operation method according to one embodiment of the present invention.

Further, temperature distribution inside the fuel cell apparatus is also largely varied depending on cell load conditions. FIG. 3 shows results obtained by examining temperature distributions in the direction of flow of the oxidizing gas at different current densities in this embodiment subjected to temperature control in accordance with the present invention. Since the temperature distribution is varied to a large extent depending on the current density, as shown in FIG. 3, it is required to properly adjust the temperature control conditions so that the maximum temperature in the low-temperature operating portions 13a, 13b is controlled to be kept not higher than the upper limit operating temperature for the reforming catalyst.

Additionally, by adopting the return flow type for a flow of the fuel gas, this embodiment is designed so that all the amount of fuel gas supplied pass through the low-temperature operating portions 13a and 13b covering the fuel gas passage. As a result, the fuel gas can be sufficiently contacted with the reforming catalyst held in the low-temperature operating portions 13a, 13b and having a high degree of activity, thereby enabling a stable internal reforming reaction for a long period.

In the present invention, it is important to determine the flow type and passage of the fuel gas so that all the amount of fuel gas supplied actually pass through the low-temperature operating portions. While the partition 14 defines the low-temperature operating portions 13a, 13b in the embodiment shown in FIG. 1, the low-temperature operating portion 13b would contain a high-temperature operating portion as its part if the partition 14 is shifted in the direction toward a gas manifold on the oxidizing gas outlet side, for example, in FIG. 1. In this case, activity of the reforming catalyst contained in that high-temperature operating portion would deteriorate to a larger extent than that of the reforming catalyst in the other low-temperature operating portions. Accordingly, a part of the fuel gas would pass through the fuel gas passage containing the reforming catalyst with a lower degree of activity, and hydrocarbon would be discharged to the outside of the fuel cell apparatus while being insufficiently reformed. Thus, the sufficient internal reforming reaction could not be continued for a long period in that case.

Embodiment 2

Figure 4:
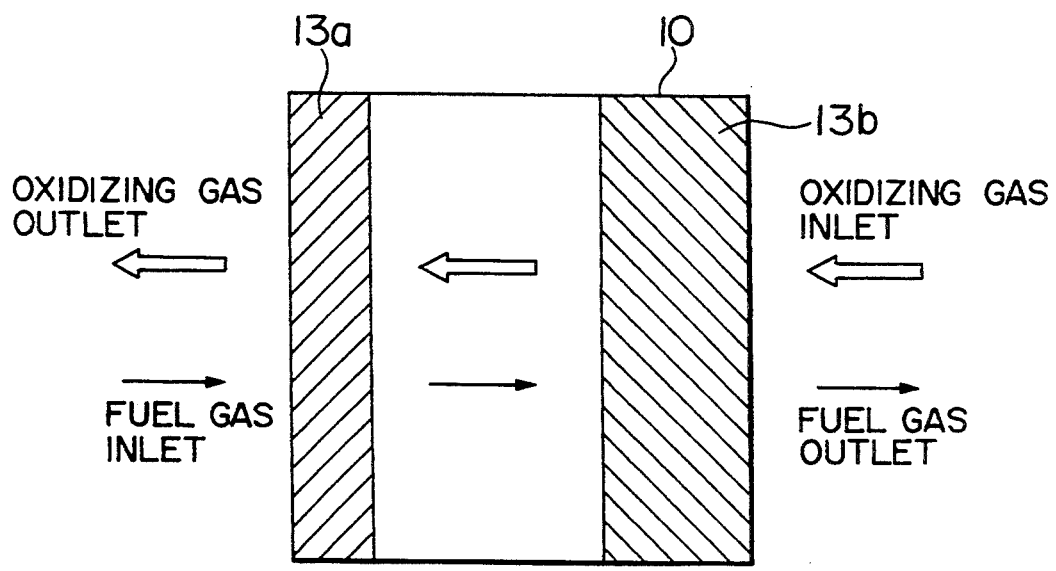
FIG. 4 is a schematic sectional view showing a primary part of a fuel cell apparatus according to another embodiment of the present invention.

While the return flow type is adopted for a flow of the fuel gas and the straight flow type is adopted for a flow of the oxidizing gas in the above embodiment of FIG. 1, other combinations of flow types may be used. FIG. 4 shows one example of other combinations of flow types and the low-temperature operating portions 13a, 13b in such a case. In this embodiment, the fuel gas and the oxidizing gas are supplied in directions opposite to each other. Thus, several combinations of gas flow types and the resulting low-temperature operating portions are conceivable in setting them. What is important is to set a low-temperature operating portion by precisely knowing temperature distribution in a cell plane resulted from flow types of the fuel gas and the oxidizing gas, dispose the reforming catalyst in the fuel gas passage belonging to the low-temperature operating portion, and further design flow types of the fuel gas and the oxidizing gas so that the fuel gas can be sufficiently contacted with the reforming catalyst in the low-temperature operating portion.

Embodiment 3

Figure 5:
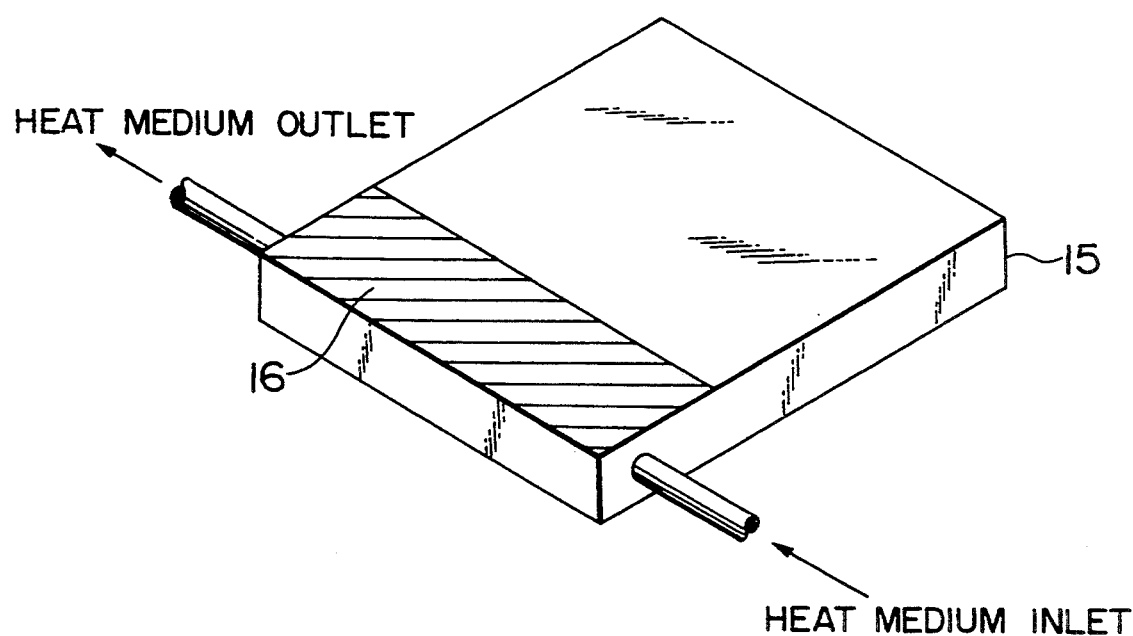
FIG. 5 is a schematic perspective view showing a primary part of a temperature control mechanism according to another embodiment of the present invention.

According to another aspect of the present invention, a temperature control mechanism is provided in the fuel cell apparatus for surely securing the low-temperature operating portion 13. FIG. 5 shows a primary part of this embodiment of the present invention. Referring to FIG. 5, a temperature control plate 15 is provided as one example of the temperature control mechanism for use with the fuel cell apparatus. In this embodiment, the temperature control plate 15 is in the form of a flat plate and, when it is used, one or a plurality of temperature control plates are inserted in the fuel cell laminate 10 built up by laminating the single cells 4. A hatched area 16 represents a portion corresponding to the low-temperature operating portion 13 in the single cell plane shown in FIG. 1, or one example of a low-temperature operation corresponding portion. Arrows indicate directions in which a heat medium is supplied to and discharged from the temperature control plate 15. The heat medium is externally supplied to and discharged from the temperature control plate 15 thereby controlling a temperature of a predetermined portion, the low temperature operating portion 16, of the fuel cell apparatus at a temperature that is lower than the upper limit operating temperature The arrangement and structure of heat medium passages in the temperature control plate 15, as well as operating conditions such as a temperature and flow rate, are determined so that the temperature of the low-temperature portion 16 is most efficiently controlled. While the embodiment shown in FIG. 1 is designed to set a low-temperature portion of the fuel cell apparatus based on the temperature distribution therein as the low-temperature operating portion and hold the reforming catalyst in that region, the temperature distribution is intrinsically largely dependent on the operating conditions such as a current density and a flow rate of the reaction gas. In the embodiment shown in FIG. 1, therefore, the operating conditions must be carefully set so that the low-temperature operating portion is held at a temperature that is not higher than the upper limit operating temperature. On the contrary, since temperature control of the low-temperature operating portion 16 can be directly performed by a function of the temperature control mechanism for the in this embodiment shown in FIG. 5, it is possible to more precisely control the temperature of the low-temperature operating portion 16 which provides a larger degree of freedom in setting the operating conditions during load operation of the fuel cell apparatus than does the embodiment shown in FIG. 1. Also, with this in the embodiment shown in FIG. 5, the position of the low-temperature operating portion 16 in the single cell plane can be relatively freely set. Stated otherwise, the temperature control mechanism can be designed so that the low-temperature operating portion is obtained at a predetermined position.

Further, other than the temperature control mechanism 15 for controlling the temperature through transfer of sensible heat of the heat medium in the temperature control plate 15, the temperature control may be performed through transfer of reaction heat in the temperature control plate 15. For example, if the reforming catalyst is held in the temperature control plate 15 and hydrocarbon and steam are supplied as a heat medium, the temperature control can be effectively performed with a small amount of heat medium by utilizing the reforming reaction heat generated by the reforming reaction. Additionally, combustible gas mainly consisted of hydrogen after the reforming can also be used as the fuel gas for the fuel cell apparatus.

Embodiment 4

Although the above embodiments have been described as providing the low-temperature operating portion in a region where the electrochemically active fuel cell action takes place inside the fuel cell apparatus, the low-temperature operating portion may be provided in a region where the fuel cell reaction does not take place. In this case, a fear of an adverse effect on the cell characteristics is eliminated and the temperature of the low-temperature operating portion can be set to a lower level. This is more advantageous in point of prolonging a service life of the catalyst. While the above embodiments have been described in connection with the fuel cell apparatus of external gas manifold type that the gas manifolds are provided outside the fuel cell laminate 10, this embodiment will be described in connection with the case where the present invention is applied to the fuel cell apparatus of internal gas manifold type.

Figure 6:
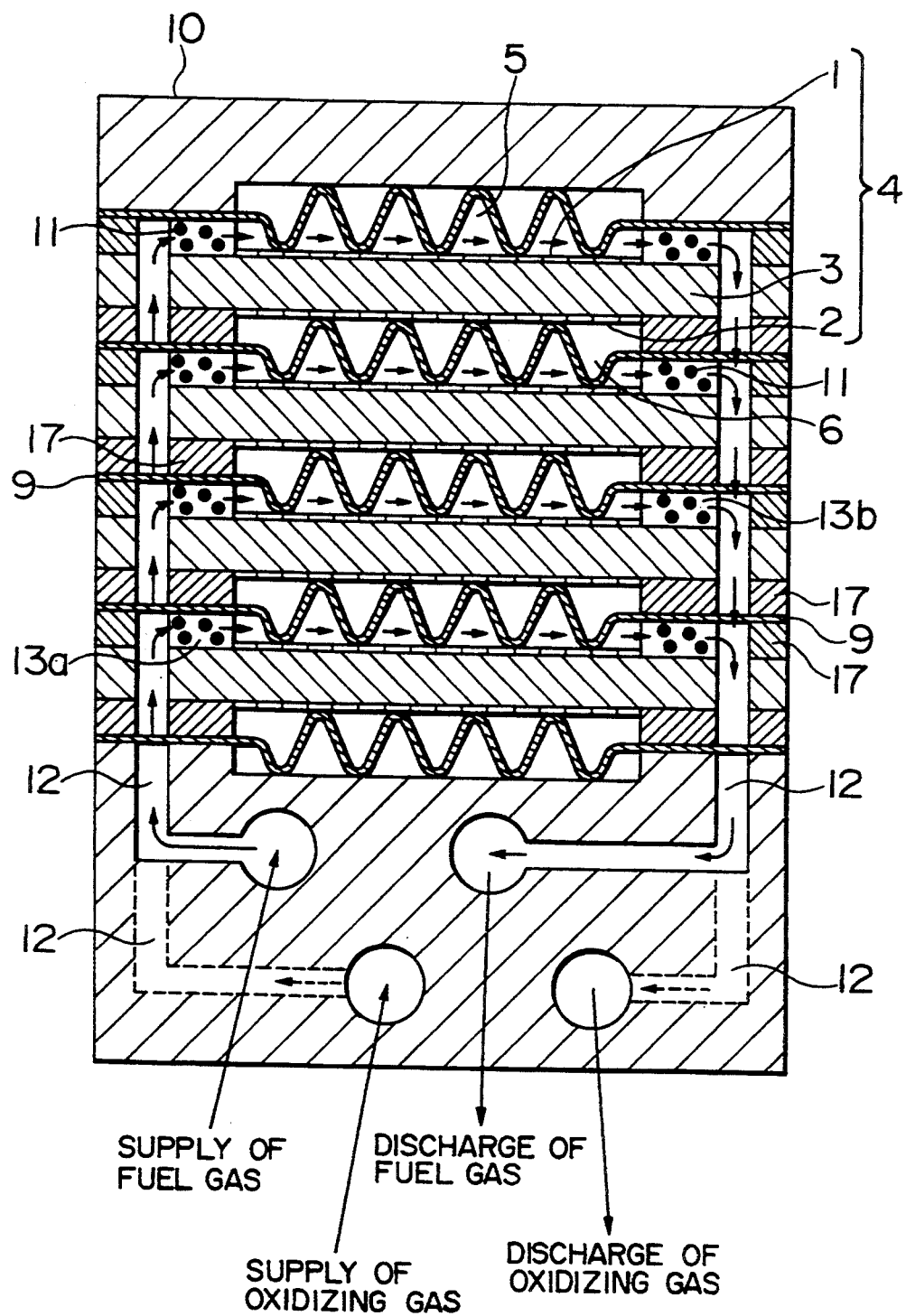
FIG. 6 is a schematic sectional view showing a primary part of a fuel cell apparatus according to another embodiment of the present invention.
Figure 7:
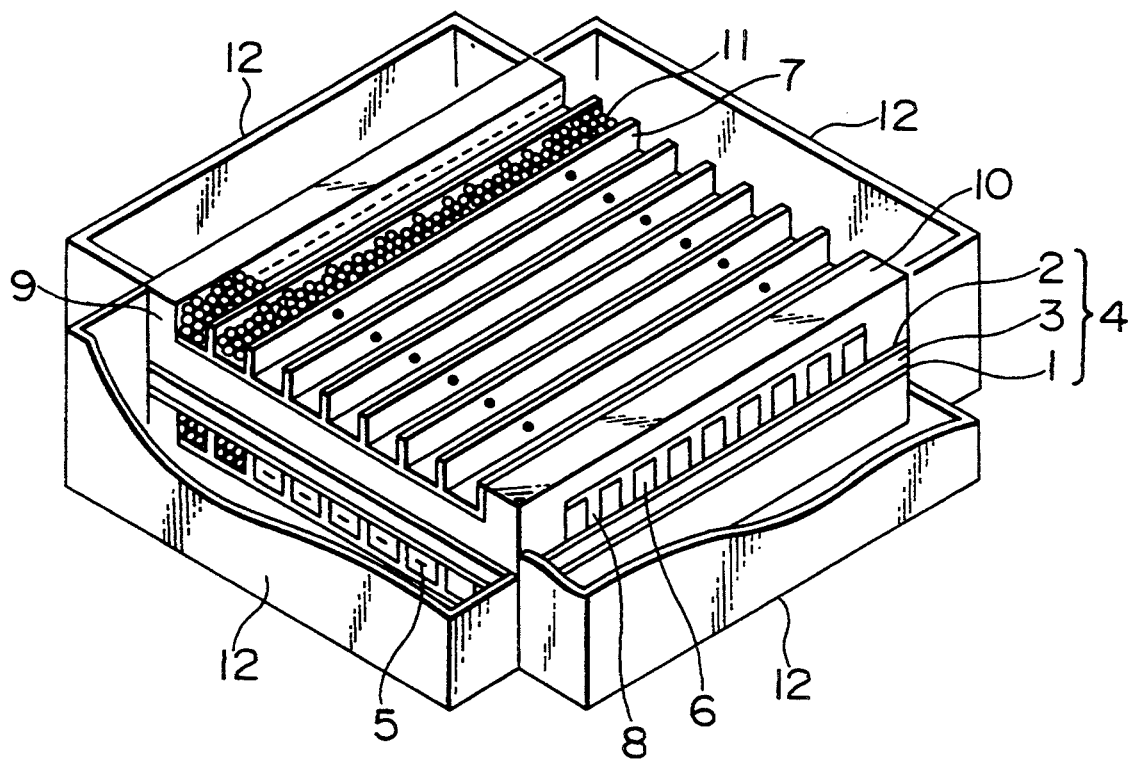
FIG. 7 is a perspective view, partly cut away, of a prior-art internal reforming type fuel cell apparatus.
Figure 8:
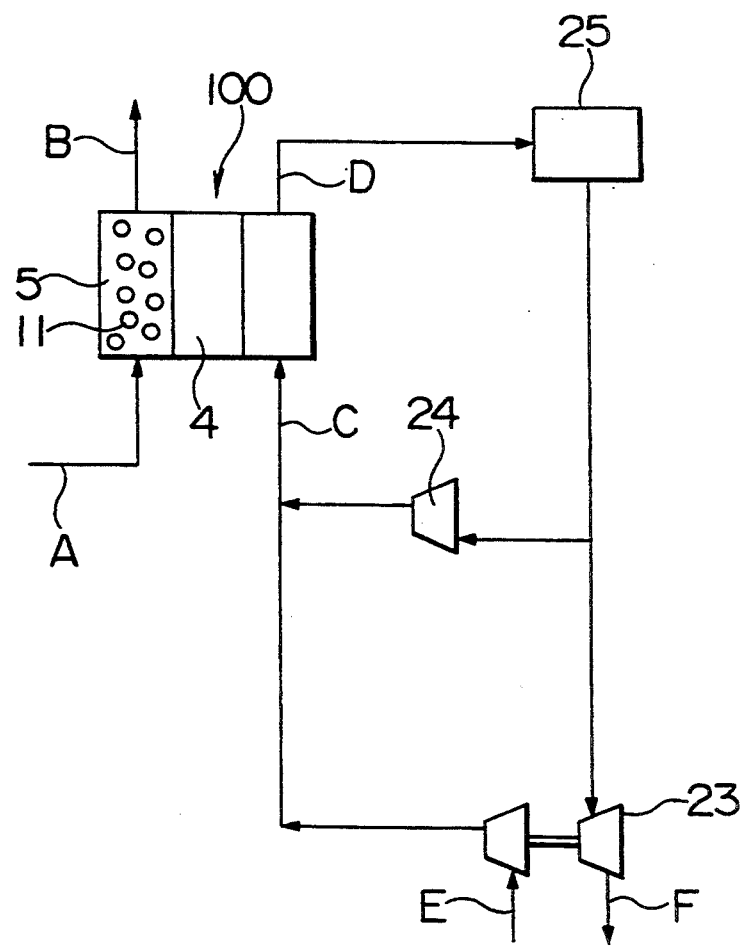
FIG. 8 is a system block diagram for explaining a temperature control method for the prior-art internal reforming type fuel cell apparatus.

FIG. 6 is a sectional view of the fuel cell laminate, sectioned in the laminating direction along a flow of the fuel gas, for use in the fuel cell apparatus of internal gas manifold type. In FIG. 6, a gas sealing member 17 defines and separates the fuel gas passage 5 and the oxidizing gas passage 6 from each other. Fuel gas guiding passages 13a, 13b guide the fuel gas to pass through the fuel gas passage 5 adjacent to the fuel gas electrode 1 from and to gas manifolds 12. In this embodiment, those portions corresponding to the fuel gas guiding passages 13a, 13b on the oxidizing gas side are usually enclosed by the gas sealing members 17 fitted in there and not adjacent to the electrode, thereby forming regions which are electrochemically inactive not to develop the fuel cell reaction and provide the low-temperature operating portions where the reforming catalyst 11 is held. Additionally, the gas sealing members 17 may be integral with the separate plate 9 at need. The gas manifolds 12 indicated by solid lines in FIG. 6 are holes penetrating the fuel cell laminate 10 in the laminating direction through which holes the fuel gas supplied from the outside is distributed to the respective single cells 4 and discharged therefrom. Solid-line arrows in the drawing indicate flows of the fuel gas. A part of a gas manifold for the oxidizing gas is indicated by broken lines.

The operation of this embodiment will now be described. The fuel gas supplied from the outside and containing hydrocarbon or alcohols is reformed in the fuel gas guiding passage (low-temperature operating portion) 13a and then supplied to the fuel gas passage 5. After being consumed by the fuel gas electrode 1 adjacent to the fuel gas passage 5 for the electrode reaction, the fuel gas is led to the fuel gas guiding passage (low-temperature operating portion) 13b. In the fuel gas guiding passage (low-temperature operating portion) 13b, the hydrocarbon not yet decomposed in the fuel gas is almost completely decomposed by a function of the reforming catalyst 11. The fuel gas after the decomposition is discharged to the outside of the fuel cell laminate 10 through the gas manifold 12. Preferably, the discharged fuel gas is utilized as fuel gas for another fuel cell apparatus separately provided in the downstream side of the fuel gas system.

While this embodiment has been described in connection with the case where the present invention is applied to the fuel cell apparatus of internal gas manifold type, the present invention is also applicable to the fuel cell apparatus of external gas manifold type. In this case, gas sealing portions around peripheral edges of the electrodes, for example, can be used as the low-temperature operating portions in which the reforming catalyst is held.

Also, while the above embodiments have been described as supplying the fuel gas mainly consisted of hydrocarbon to the fuel cell apparatus, the present invention is also effective to the case of supplying fuel gas mainly consisted of hydrogen and containing a small amount of hydrocarbon. In this case, however, the temperature distribution in the single cell plane is different from the case of using the fuel gas main consisted of hydrocarbon. For example, when the content of hydrocarbon in the fuel gas is low in the passage configuration shown in FIG. 1, the temperature of the low-temperature operating portion 13a shown in FIG. 1 is not so lowered. Accordingly, the low-temperature operating portion is required to be newly set depending on the operating conditions including ingredients of the fuel gas.

As described above, the present invention is constituted such that the reforming catalyst is disposed in the fuel gas passage belonging to the low-temperature operating portion determined based on the temperature distribution in the single cell plane, and the fuel gas is contacted with the reforming catalyst disposed in the low-temperature operating portion. Thus, since the temperature distribution inevitably intrinsically produced in the fuel cell apparatus during its operation is utilized to dispose the reforming catalyst in the fuel gas passage belonging to the low-temperature operating portion, activity of the reforming catalyst can be held for a long period without deteriorating cell characteristics. In addition, since the supplied fuel gas is sufficiently contacted with the reforming catalyst having a high degree of activity and disposed in the low-temperature operating portion, hydrocarbon is so sufficiently reformed in a stable manner for a long period as to provide a fuel cell with good internal reforming characteristics.

Also, since the present invention is constituted such that the temperature control mechanism is inserted in the laminate to form the low-temperature operating portion in the single cell plane, the reforming catalyst is disposed in the fuel gas passage belonging to the low-temperature operating portion, and further the fuel gas is contacted with the reforming catalyst disposed in the low-temperature operating portion, the low-temperature operating portion can be precisely controlled in its temperature, the degree of freedom in operating conditions can be increased in comparison with the case of utilizing the temperature distribution inevitably intrinsically produced in the fuel cell apparatus during its operation, and further the position of the low-temperature operating portion in the single cell plane can be relatively freely set.

Moreover, since the present invention is constituted such that the reforming catalyst is disposed in the low-temperature operating portion formed in a region not subjected to the electrode reaction and the fuel gas is contacted with the reforming catalyst disposed in the low-temperature operating portion, a fear of an adverse effect on the cell characteristics is lessened and the temperature of the portion where the reforming catalyst is disposed can be set to a lower level.

Additionally, since temperature control is made so that the temperature of the low-temperature operating portion will not exceed an activity deterioration limit temperature of the reforming catalyst, the internal reforming type fuel cell apparatus can be stably operated for a-long period without lowering activity of the reforming catalyst.

What is claimed is:

1. An internal reforming type fuel cell apparatus comprising a fuel cell laminate built up by laminating a plurality of single cells through a plurality of separator plates, each of said plurality of single cells being constituted by a fuel gas electrode and an oxidizing gas electrode opposing each other through an electrolyte layer,
   a fuel gas passage formed between said fuel gas electrode and a first one of said plurality of separator plates,
   an oxidizing gas passage formed between said oxidizing gas electrode and a second one of said plurality of separator plates, such that the first and second ones of said plurality of separator plates oppose one another and sandwich said fuel gas electrode, said electrolyte layer, and said oxidizing gas electrode between them,
   gas manifolds for supplying, distributing, and discharging fuel gas and oxidizing gas that are both supplied from the outside with respect to said fuel gas passage and said oxidizing gas passage,
   wherein said fuel gas passage extends along and delimits a fuel gas flow path, wherein said fuel cell operates so that a first length of said fuel gas passage along the fuel gas flow path is at a lower temperature than a second length of said fuel gas passage along the fuel gas flow path;
   means for maintaining a temperature of the first length of said fuel gas passage lower than a temperature of the second length of said fuel gas passage during operation of the fuel cell; and
   a reforming catalyst disposed in the first length of said fuel gas passage.

2. An internal reforming type fuel cell apparatus according to claim 1, further comprising a temperature control mechanism for controlling temperature in the first length of said fuel gas passage in each of said plurality of single cells.

3. An internal reforming type fuel cell apparatus according to claim 1, wherein said reforming catalyst is disposed in the first length of said fuel gas passage, wherein an electrode reaction does not take place.

4. An internal reforming type fuel cell apparatus according to claim 1, wherein said fuel gas passage comprises at least one bend such that portions of said fuel gas flow path are adjacent one another and directions of fuel gas flow in these adjacent portions is opposite one another.

5. An internal reforming type fuel cell apparatus according to claim 1, wherein all of said fuel gas flow path is along a straight line.

6. Operating method of an internal reforming type fuel cell apparatus including a fuel cell laminate built up by laminating a plurality of single cells through a plurality of separator plates,
   each of said single cells being constituted by a fuel gas electrode and an oxidizing gas electrode opposing each other through an electrolyte layer,
   a fuel gas passage formed between said fuel gas electrode and a first one of said plurality of separator plates, an oxidizing gas passage formed between said oxidizing gas electrode and a second one of said plurality of separator plates, said first and second ones of said plurality of separator plates sandwiching the fuel gas electrode, the electrolyte layer, and the oxidizing gas electrode, gas manifolds for supplying, distributing and discharging fuel gas and oxidizing gas both supplied from the outside with respect to said fuel gas passage and said oxidizing gas passage, wherein said gas manifolds supply fuel gas to the fuel gas passage so that fuel gas flows through the fuel gas passage along a fuel gas flow path, said fuel gas passage having a high-temperature operating portion and a low-temperature operating portion which are each separate from one another and at different regions along the fuel gas flow path and a reforming catalyst disposed in the low-temperature operating portion of said fuel gas passage, said operating method of said internal reforming fuel cell apparatus comprising the step of:

introducing fuel gas and oxidizing gas from said gas manifolds into said fuel gas passage and said oxidizing gas passage, respectively, to cause electrode reactions at said fuel gas electrode and said oxidizing electrode; and performing temperature control so that the temperature of the low-temperature operating portion of said fuel gas passage produced due to temperature distribution in said single cell is lower than a temperature of the high-temperature operating portion, and so that said low-temperature operating portion temperature does not exceed an activity deterioration limit temperature of said reforming catalyst.

7. An internal reforming type fuel cell apparatus according to claim 1, wherein said fuel cell is of the concurrent flow type.

8. An internal reforming type fuel cell apparatus according to claim 1, wherein said fuel cell is of the counter-current flow type.

9. An internal reforming type fuel cell apparatus according to claim 1, wherein the reforming catalyst is disposed only in the first length of said fuel gas passage.

10. An operating method of an internal reforming type fuel cell apparatus according to claim 6, wherein said reforming catalyst resides only in said first length of said fuel gas passage.

* * * * *